(12) United States Patent
Stern et al.

(10) Patent No.: US 11,765,038 B2
(45) Date of Patent: Sep. 19, 2023

(54) APPARATUSES, METHODS, AND SYSTEM FOR MATCHING OPERATIONS OF CLIENT DEVICES HOSTED ON A NETWORK WITH CONTEXTUAL AUTOMATIONS

(71) Applicant: ARRIS Enterprises LLC, Suwanee, GA (US)

(72) Inventors: Ronen Stern, Suwanee, GA (US); Mario Mejia, Suwanee, GA (US); Jonathan Wu, Suwanee, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 93 days.

(21) Appl. No.: 17/168,844

(22) Filed: Feb. 5, 2021

(65) Prior Publication Data

US 2021/0249146 A1 Aug. 12, 2021

Related U.S. Application Data

(60) Provisional application No. 62/971,151, filed on Feb. 6, 2020.

(51) Int. Cl.
*H04L 41/12* (2022.01)
*H04L 12/28* (2006.01)
(Continued)

(52) U.S. Cl.
CPC .............. *H04L 41/12* (2013.01); *G16Y 10/75* (2020.01); *G16Y 10/80* (2020.01); *G16Y 20/20* (2020.01);
(Continued)

(58) Field of Classification Search
CPC ........ G16Y 10/75; G16Y 10/80; G16Y 20/20; G16Y 40/35; H04L 41/12; H04L 41/22;
(Continued)

(56) References Cited

U.S. PATENT DOCUMENTS 8,042,048 B2 * 10/2011 Wilson ................ H04L 12/2807 700/83
2010/0202450 A1 * 8/2010 Ansari ................ H04L 12/2818 370/389

(Continued)

FOREIGN PATENT DOCUMENTS

| EP | 3 235 182 | 10/2017 |
|---|---|---|
| WO | 2016/099148 | 6/2016 |

OTHER PUBLICATIONS

International Search Report and the Written Opinion of the International Searching Authority dated Apr. 20, 2021 in International (PCT) Application No. PCT/US2021/016839.

(Continued)

*Primary Examiner* — Jason D Recek
(74) *Attorney, Agent, or Firm* — Wenderoth, Lind & Ponack, L.L.P.

(57) ABSTRACT

A router device for matching operations of client devices hosted on a network with contextual automations gathers device information from client devices that are connected to the router device via a wireless local area network (WLAN), wherein the client devices include a user device and one or more other devices, sends the device information collected from the client devices to a first remote server, receives device identification information of the client devices from the first remote server based on the device information, respectively, sends the device identification information of the client devices to a second remote server, receives a list of condition-based automations (CBAs) that are available and applicable for one or more of the client devices from the second remote server based on the device identification information, and sends the list of CBAs to the user device for presentation via a display.

20 Claims, 7 Drawing Sheets

(51) Int. Cl.
*G16Y 10/80* (2020.01)
*G16Y 20/20* (2020.01)
*G16Y 40/35* (2020.01)
*G16Y 10/75* (2020.01)
*H04L 41/22* (2022.01)
*H04W 84/12* (2009.01)

(52) U.S. Cl.
CPC .......... *G16Y 40/35* (2020.01); *H04L 12/2803* (2013.01); *H04L 41/22* (2013.01); *H04W 84/12* (2013.01)

(58) Field of Classification Search
CPC ............. H04L 12/2803; H04L 12/2807; H04L 12/2809; H04L 12/282; H04L 12/2827; H04L 12/2832; H04L 12/2834; H04W 84/12; H04W 40/24; G05B 19/042; G05B 2219/31162
See application file for complete search history.

(56) References Cited

U.S. PATENT DOCUMENTS

| | | | |
|---|---|---|---|
| 2013/0086245 A1* | 4/2013 | Lu | H04L 12/66 709/250 |
| 2017/0078922 A1* | 3/2017 | Raleigh | H04W 28/10 |
| 2017/0142230 A1* | 5/2017 | Hou | H04L 69/30 |
| 2019/0028338 A1 | 1/2019 | Kozura et al. | |

OTHER PUBLICATIONS

Haotian Chi et al., "PFirewall: Semantics-Aware Customizable Data Flow Control for Home Automation Systems", arxiv.org. Cornell University Library, 201 Olin Library Cornell University Ithaca, NY 14853, Oct. 17, 2019 (Oct. 17, 2019). XP081517098, the whole document.

International Preliminary Report on Patentability dated Jul. 28, 2022 in International (PCT) Application No. PCT/US2021/016839.

* cited by examiner (a)

(b)

(a)

(b)

APPARATUSES, METHODS, AND SYSTEM FOR MATCHING OPERATIONS OF CLIENT DEVICES HOSTED ON A NETWORK WITH CONTEXTUAL AUTOMATIONS

BACKGROUND

In the field of personal electronic devices, established primary companies (such as Apple, Google, and Amazon) have developed their own platforms, or ecosystems, of devices which communicate well with devices made by the same company, but which do not integrate together with platforms or ecosystems of other companies. Furthermore, there are many secondary companies (such as Logitech, Next, and Ring) that have also developed their own client devices and hub devices. This represents a situation of electronic communication ecosystem silos, or technologically walled gardens, in which electronic devices of a given manufacturer communicate well within their own silo, but communication and coordination between electronic devices of different manufacturers is difficult. There is no prior solution that integrates device identification (fingerprinting) with Wi-Fi sensing, and remote (e.g., cloud based) universal cross-platform translation of communications to deliver a Wi-Fi motion based smart home automation solution, as disclosed herein.

Due to these compatibility issues, consumers are either hesitant to purchase devices from different manufacturers, and stay within the silo of a company who made a device they own, such as their mobile phone, or, if they live in a multiplatform home or work environment, (such as Android smartphones, Tizen TVs, and Amazon smart speakers) they are not able to synchronize operations of the devices made by the disparate manufacturers of the devices. Therefore, there is not enough automation between various different devices, sensors, and platforms of the users, which makes the effective implementation of a "smart home" difficult or impossible.

The Wi-Fi router (e.g., a home gateway device (GW), a wireless access point (AP), or the like) is the central device in a smart home which communicatively connects all electronically connected (e.g., IP-connected) devices. This position allows the router (GW/AP) of the present disclosure to provide a unique opportunity to aggregate connected device information and provide the user with proposed (relevant, helpful, recommended, etc.) contextual automations for devices and/or combinations of devices regardless of their manufacturer or platform, and can be implemented, via the router (GW/AP), using a cloud-to-cloud solution that removes barriers between different ecosystems which may have compatibility issues.

SUMMARY

Accordingly, there is a need to provide an electronic apparatus, such as a router device (e.g., GW, AP), having software programs stored in a memory thereof, and at least one processor for executing the programs to gather information from the client devices on the WLAN (e.g., MAC, OUI, device type, make/model, etc.), gather information related to movement of people, devices, and/or objects in the home using Wi-Fi motion detection, send the information gathered from client devices on the WLAN to remote servers (e.g., cloud-based computers), and receive information from the remote servers to instruct some determined action by other client devices on the WLAN, even though the client devices are of different platform types.

An aspect of the present disclosure relates to a router device for matching operations of client devices hosted on a network with contextual automations, the router device including a memory storing instructions, and a processor configured to execute the instructions to gather device information from client devices that are connected to the router device via a wireless local area network (WLAN), wherein the client devices include a user device and one or more other devices, send the device information collected from the client devices to a first remote server, receive device identification information of the client devices from the first remote server based on the device information, respectively, send the device identification information of the client devices to a second remote server, receive a list of condition-based automations (CBAs) that are available and applicable for one or more of the client devices from the second remote server based on the device identification information, and send the list of CBAs to the user device for presentation via a display.

In another aspect of the present disclosure, the device identification information of each client device is determined based on a device identification information database storing mappings for translating device information of the client devices into corresponding device identification information for the client devices, respectively. The device information includes at least one of media access control (MAC) addresses and organizationally unique identifiers (OUIs) of the client devices, and the device identification information includes at least one of device type and make/model of the client devices.

In another aspect of the present disclosure, the list of CBAs for the client devices is determined based on a contextual device actions database storing mappings for translating device identification information of the client devices into corresponding condition-based automations that are available and applicable for the client devices or different combinations of multiple client devices, respectively. The device identification information of the client devices includes at least one of device type and make/model of the client devices, and the condition-based automations for the client devices include one or more device actions to be performed by one or more client devices or a series of interactions between multiple client devices.

In another aspect of the present disclosure, in response to receiving one or more commands via an application installed on the user device, the processor of the router device is configured to execute the instructions to initiate a device scanning procedure to detect the client devices that are connected to the router via the WLAN, and filter the list of CBAs that are available and applicable for the one or more client devices to generate a set of recommended CBAs that are most useful, helpful, or popular, depending on particular client devices or combinations of client devices that are present in the WLAN.

In another aspect of the present disclosure, the processor of the router device is further configured to execute the instructions to receive a notification indicating one or more user-selected CBAs from among the list of CBAs that are available and applicable for the one or more client devices from the user device, monitor the WLAN for conditions that cause triggering one or more device actions associated with the one or more user-selected CBAs, determine whether the conditions for triggering the one or more device actions associated with at least one of the one or more user-selected CBAs are satisfied, and send control instructions associated with the one or more device actions to at least one of the client devices, in response to determining that the conditions for triggering the one or more device actions associated with the at least one of the one or more user-selected CBAs have been satisfied.

In another aspect of the present disclosure, the control instructions sent by the router device cause the at least one of the client devices to perform the one or more device actions associated with the at least one of the user-selected CBAs, respectively.

An aspect of the present disclosure relates to a method for matching operations of client devices hosted on a network with contextual automations, the method including gathering device information from client devices that are connected to a router device via a wireless local area network (WLAN), wherein the client devices include a user device and one or more other devices, sending the device information collected from the client devices to a first remote server, receiving device identification information of the client devices from the first remote server based on the device information, respectively, sending the device identification information of the client devices to a second remote server, receiving a list of condition-based automations (CBAs) that are available and applicable for one or more of the client devices from the second remote server based on the device identification information, and sending the list of CBAs to the user device for presentation via a display.

In another aspect of the present disclosure, the first remote server receives the device information of the client devices from the router device, determines the device identification information of each client device associated with the device information, respectively, based on a device identification information database, and sends the device identification information of the client devices to the router device.

In another aspect of the present disclosure, the second remote server receives the device identification information of the client devices from the router device, determines whether there are any condition-based automations (CBAs) that are available and applicable for each client device or different combinations of multiple client devices associated with the device identification information of the client devices, respectively, based on a contextual device actions database, and sends the list of CBAs that are available and applicable for the one or more client devices to the router device.

In another aspect of the present disclosure, the user device initiates a device scanning procedure to detect client devices in the WLAN via an application installed on the user device, receives the list of CBAs that are available and applicable for the one or more client devices from the router device, presents the list of CBAs via a graphical user interface (GUI) shown on the display, receives a user selection of one or more CBAs from among the list of CBAs for the one or more client devices via the GUI, and sends a notification indicating the one or more user-selected CBAs to the router device.

In another aspect of the present disclosure, the method further includes receiving a notification indicating one or more user-selected CBAs from among the list of CBAs that are available and applicable for the one or more client devices from the user device, monitoring the WLAN for conditions that cause triggering one or more device actions associated with the one or more user-selected CBAs, determining whether the conditions for triggering the one or more device actions associated with at least one of the one or more user-selected CBAs are satisfied, and sending control instructions associated with the one or more device actions to at least one of the client devices, in response to determining that the conditions for triggering the one or more device actions associated with the at least one of the one or more user-selected CBAs have been satisfied.

In another aspect of the present disclosure, the at least one of the client devices receives the control instructions associated with the at least one of the user-selected CBAs from the router device, and performs the one or more device actions associated with the at least one of the user-selected CBAs based on the control instructions.

An aspect of the present disclosure relates to a non-transitory computer-readable medium storing a program of instructions for matching operations of client devices hosted on a network with contextual automations, the instruction when executed by a processor of a router device causing the router device to perform operations, including the operations of the method described above.

Another aspect of the present disclosure relates to a system including the router, the client devices, and the remote servers. Some other aspects of the present disclosure relate to methods performed by the router in communication with the client devices and remote servers. Another aspect of the present disclosure is one or more non-transitory computer-readable media storing instructions, which when executed by one or more processors of one or more electronic devices (the router, the client device(s), the remote server(s), and/or combinations thereof), causes the electronic device(s) to perform one or more steps of the methods described herein.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples and not for the purpose of limiting the present disclosure as defined by the appended claims and their equivalents. The words and phrases used in the following description and claims are merely used to enable a clear and consistent understanding of the present disclosure. In addition, descriptions of well-known structures, functions, and configurations may be omitted for clarity and conciseness. Those of ordinary skill in the art will recognize that various changes and modifications of the examples described herein can be made without departing from the spirit and scope of the present disclosure.

Figure 1:
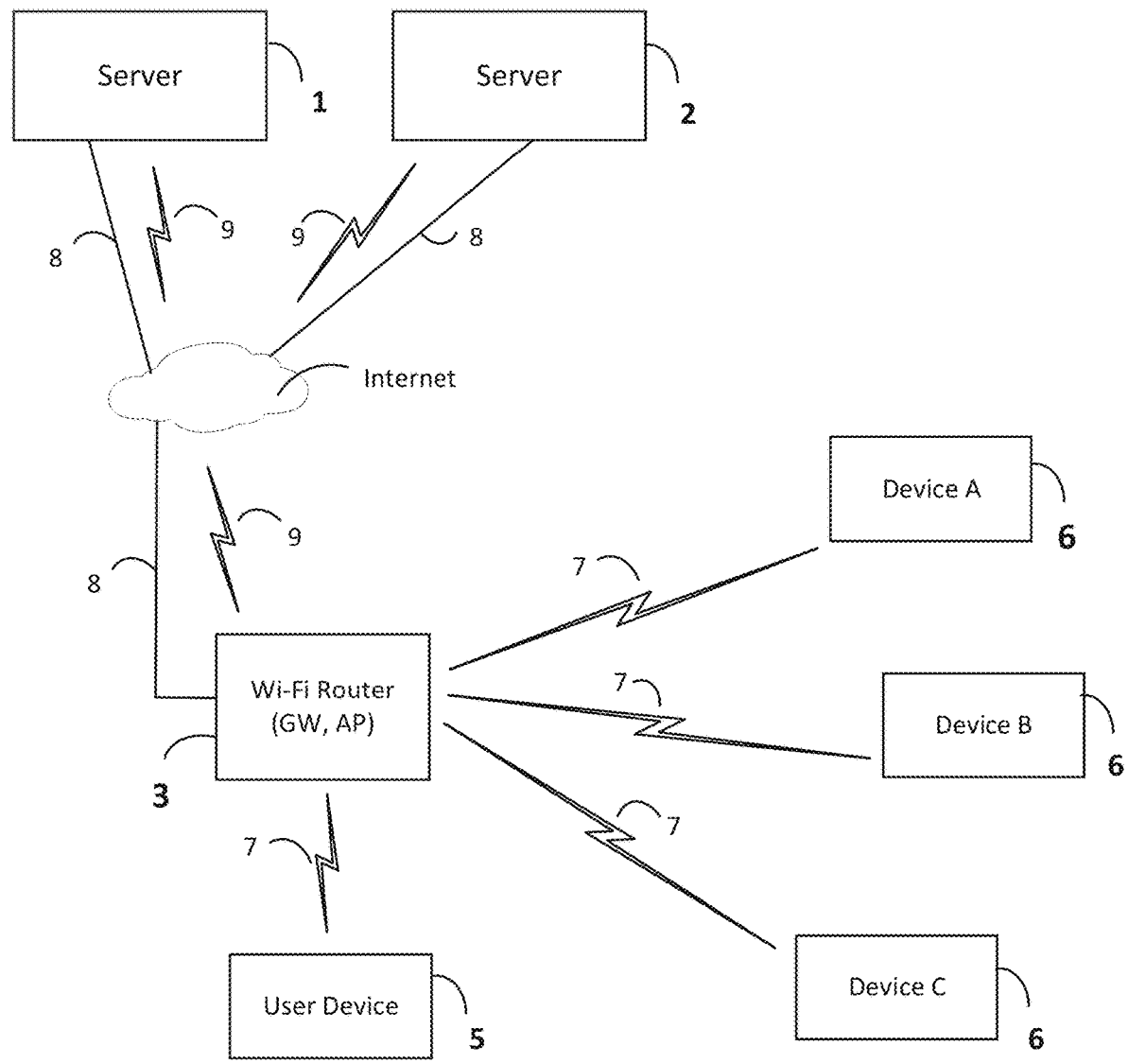
FIG. 1 illustrates an example system for matching operations of client devices hosted on a network with contextual automations, according to some example embodiments.

FIG. 1 illustrates an example system for matching operations of client devices hosted on a network with contextual automations, according to some example embodiments.

It should be appreciated that various example embodiments of inventive concepts disclosed herein are not limited to specific numbers or combinations of devices, and there may be one or multiple of some of the aforementioned electronic apparatuses in the system, which may itself consist of multiple communication networks and various known or future developed wireless connectivity technologies, protocols, devices, and the like.

As shown in FIG. 1, the system includes a router device 3 (e.g., a home gateway device (GW), a wireless access point (AP), or the like) that is in wired or wireless communication with one or more server devices 1, 2 (e.g., via a wide area network (WAN), also referred to as the Internet), and that is in wireless communication with one or more client devices 5, 6 (e.g., via a wireless local area network (WLAN), also referred to as a home Wi-Fi network). The router device 3 connects to the internet (WAN) by any known manner (e.g., cable (DOCSIS), fiber, or by wireless such a 5G).

As shown in FIG. 1, the client devices may include a user device 5 (e.g., a mobile device such as a smartphone, or a computer, a laptop, a tablet, etc.) and one or more other devices 6 (e.g., devices A, B, and C). The client devices 6 may include various types of electronic devices including but not limited to computers, tablets, speakers, lights, televisions, appliances, Internet of Things (IoT) devices, etc. that are present in the user's home Wi-Fi network.

The wireless connection 7 between the router device 3 and the client devices 5, 6 can be implemented using a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally or alternatively, the wireless connection 7 can be implemented using a wireless connection that operates in accordance with, but is not limited to, RF4CE protocol, ZigBee protocol, Z-Wave protocol, or IEEE 802.15.4 protocol.

As shown in FIG. 1, the server devices may include a server 1 (e.g., Fing or the like) and a server 2 (e.g., IFTTT, or the like). The server devices 1, 2 may include remote computers, databases and/or cloud repositories (e.g., storing device identification information mappings, contextual device action mappings, etc.), which may store various different forms of data and instructions, and may be responsible for performing different functions of the methods described herein in connection with the router device 3.

The wired connection 8 and/or the wireless connection 9 between the router device 3 and the remote server devices 1, 2 via the Internet can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example. The wireless connection 9 can further include as some portion thereof a broadband mobile phone network connection, an optical network connection, or other similar connections. For example, the wireless connection 9 can also be implemented using a fixed wireless connection that operates in accordance with, but is not limited to, 3rd Generation Partnership Project (3GPP) Long Term Evolution (LTE) or 5G protocols.

Figure 2:
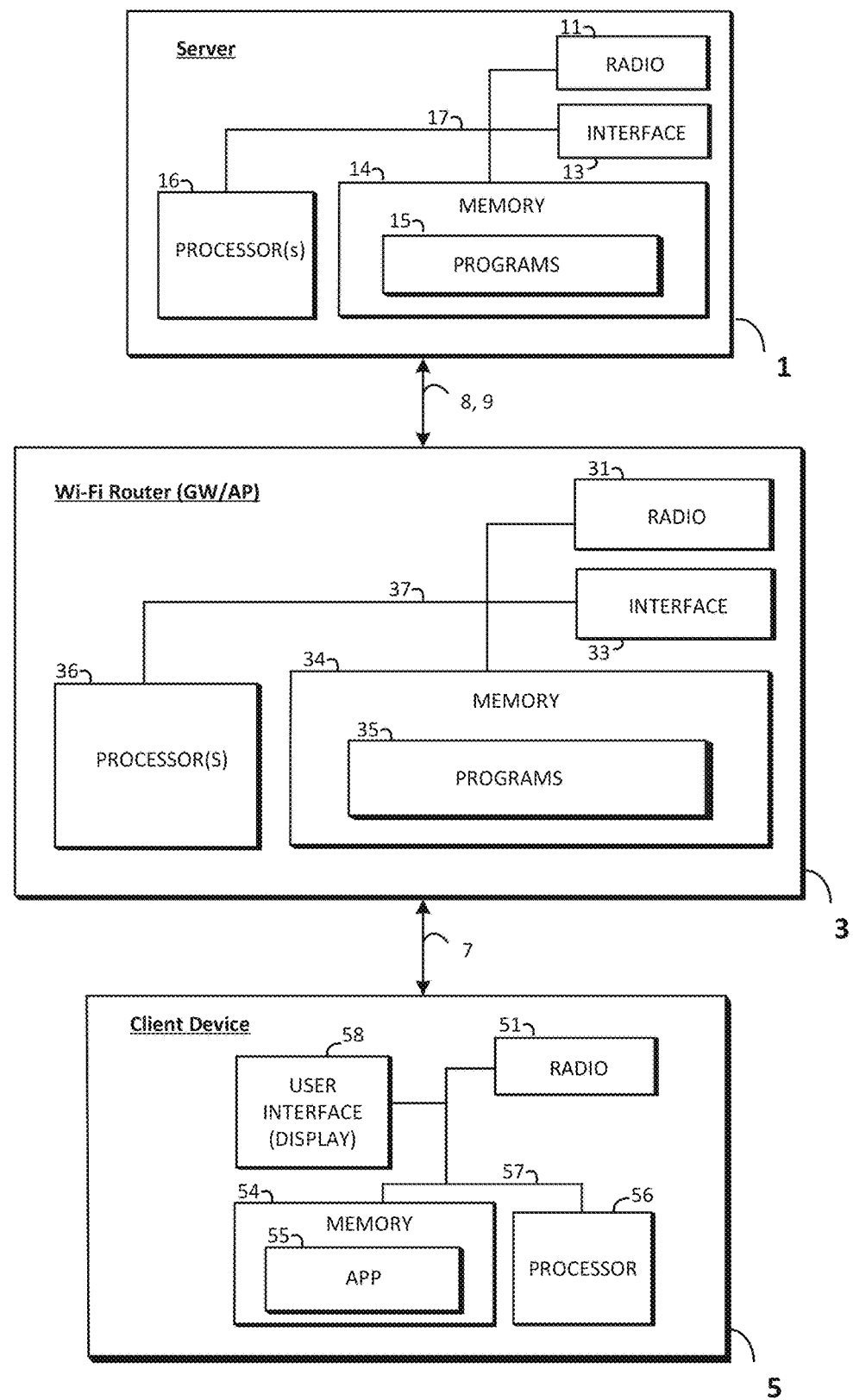
FIG. 2 illustrates various structural components (combinations of hardware and software) of the router device, the remote server(s), and the client device(s) of FIG. 1, according to some example embodiments.

A more detailed description of the exemplary internal components of the server devices 1, 2, the router device 3, and the client devices 5, 6 shown in FIG. 1 will be provided in the discussion of FIG. 2. However, in general, it is contemplated by the present disclosure that the servers devices 1, 2, the router device 3, and the client devices 5, 6 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the server devices 1, 2, the router device 3, and the client devices 5, 6 may be adapted to execute any operating system, including Linux, UNIX, Windows, MacOS, DOS, and ChromeOS as well as virtual machines adapted to virtualize execution of a particular operating system, including customized and proprietary operating systems. The server devices 1, 2, the router device 3, and the client devices 5, 6 are further equipped with components to facilitate communication with other computing devices over the one or more network connections to local and wide area networks, wireless and wired networks, public and private networks, and any other communication network enabling communication in the system.

FIG. 2 illustrates various structural components (combinations of hardware and software) of the router device, the remote server(s), and the client device(s) of FIG. 1, according to some example embodiments.

The server devices 1, 2 of the system of FIG. 1 can include, for example, remote computers, databases and/or cloud repositories (e.g., storing device identification information mappings, contextual device action mappings, etc.), which may store various different forms of data and instructions, and may be responsible for performing different functions of the methods described herein in connection with the router device 3. For example, the server 1 may provide a device identification service (e.g., Fing or the like), and the server 2 may provide a device action automation service (e.g., "if this then that" (IFTTT) or the like).

As shown in FIG. 2, the server device 1 may include one or more processor(s) 16, a memory 14 having stored thereon one or more programs 15 (and data), an interface 13 for connecting to the internet (e.g., a wired or wireless WAN interface), (optionally) a radio 11 for implementing wireless 5G communication to the internet (WAN), and a bus 17 for enabling internal connections and communications between the various components of the server device 1.

The radio 11 and the interface 13 may include various network cards, and circuitry implemented in software and/or hardware to enable communications between the server device 1 and the router device 3 via the internet (e.g., WAN) using the wired and/or wireless protocols in accordance with connections 8 and/or 9 (as described with reference to FIG. 1).

The memory 14 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 14 can be used to store any type of instructions, software, or algorithm including one or more programs 15 for controlling the general functions and operations of the server device 1 and performing management functions related to the other devices (e.g., client devices 5, 6) in the network in accordance with the embodiments described in the present disclosure.

The one or more processor(s) 16 control(s) the general operations of the server device 1 as well as performs management functions related to the other devices (e.g., client devices 5, 6) in the network. The processor(s) 16 may also be referred to as a cloud resource controller. The processor(s) 16 can include, but is/are not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software including the programs 15 for controlling the operation and functions of the server device 1 in accordance with the embodiments described in the present disclosure.

The server device 2 of FIG. 1 (not shown in FIG. 2) may include similar components and connections as the server device 1 of FIG. 2. The remote servers 1, 2 may include or may be in communication with, a database or cloud repository (not shown in FIG. 2), respectively. For example, the server 1 may locally store (e.g., in the memory 14) or may be connected to a device identification information database, including mappings for translating device information (e.g., MAC addresses, OUIs, detected information, etc.) to corresponding device identification information (e.g., device type, make/model, etc.), and the server 2 may locally store or may be connected to a contextual device actions database, including mappings for translating device identification information (e.g., device type, make/model, etc.) to corresponding condition-based automations (CBAs).

The router device 3 of the system of FIG. 1 can include, for example, a hardware electronic device that can combine the functions of a modem, an access point (AP), and/or a router for providing content received from the Internet (WAN) to network devices (e.g., client devices 5, 6) in the system. It is also contemplated by the present disclosure that the router device 3 can include the function of, but is not limited to, an IP/QAM STB or SMD that is capable of decoding audio/video content, and playing OTT or MSO provided content. The router device 3 may also be referred to as a residential gateway (RG), a gateway device (GW), a broadband access gateway, a home network gateway, or the like.

As shown in FIG. 2, the router device 3 (GW/AP) includes one or more processor(s) 36, a memory 34 having stored thereon one or more programs 35 (and data), an interface 33 for connecting to the internet (e.g., a wired or wireless WAN interface), at least one radio 31 for implementing Wi-Fi communication in the WLAN (and optionally for implementing wireless 5G communication to the internet/WAN), and a bus 37 for enabling internal connections and communications between the various components of the router 3.

The at least one radio 31 may include various network cards, and circuitry implemented in software and/or hardware to enable communications with the servers 1, 2 and the client devices 5, 6 using the communication protocols in accordance with connections 7, 8 and/or 9 (as described with reference to FIG. 1). The at least one radio 31 may be configured to operate in at least one radio frequency (RF) band (e.g., 2.4 GHz, 5 GHz, 6 GHz, 60 GHz, etc.), and may include multiple radios each operating in a different RF band.

The interface 33 may include various network cards, and circuitry implemented in software and/or hardware to enable communications between the router device 3 and the server device 1, 2 via the Internet (e.g., WAN), using the wired and/or wireless protocols in accordance with connections 8 and/or 9 (as described with reference to FIG. 1).

The memory 34 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 34 can be used to store any type of instructions, software, or algorithm including one or more programs 35 for controlling the general functions and operations of the router device 3 and performing management functions related to the other devices (e.g., client devices 5, 6) in the network in accordance with the embodiments described in the present disclosure.

The one or more processor(s) 36 control(s) the general operations of the router device 3 as well as performs management functions related to the other devices (e.g., client devices 5, 6) in the network. The processor(s) 36 may also be referred to as a gateway access point (AP) wireless resource controller. The processor(s) 36 can include, but is/are not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software including the programs 35 for controlling the operation and functions of the router device 3 in accordance with the embodiments described in the present disclosure.

The client devices (e.g., the user device 5 and/or the other devices 6) of the system of FIG. 1 can include, for example, a computer, a portable device, an electronic tablet, an e-reader, a PDA, a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the router device 3. Additionally, the client devices 5, 6 can include a TV, an IP/QAM STB, or an SMD that is capable of decoding audio/video content, and playing over OTT or MSO provided content received through the router device 3.

As shown in FIG. 2, the client device 5 may include at least one processor 56, a memory 54 having stored thereon one or more applications 55 (apps, programs, and data), at least one radio 51 for implementing Wi-Fi communication with the router device 3 (and for implementing wireless 4G and/or 5G communication to the internet), and a bus 57 for enabling internal connections and communications between the various components of the client device 5.

The at least one radio 51 can include, but is not limited to, various network cards, and circuitry implemented in software and/or hardware to enable communications with the router device 3 using the communication protocols in accordance with connection 7 (as described with reference to FIG. 1). The at least one radio 51 may be configured to operate in at least one radio frequency (RF) band (e.g., 2.4 GHz, 5 GHz, 6 GHz, 60 GHz, etc.).

The memory 54 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 54 can be used to store any type of instructions, software, or algorithms including programs and/or applications 55 for controlling the general function and operations of the client device 5 in accordance with the embodiments described in the present disclosure.

The at least one processor 56 controls the general operations of the client device 5 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the applications 55 for controlling the operation and functions of the client device 5 in accordance with the embodiments described in the present disclosure.

At least one of the client devices of FIG. 1, such as the user device 5 (e.g., a mobile device such as a smartphone), may include a user interface 58, such as a display screen (e.g., which may present a graphical user interface (GUI)), for outputting information to and/or receiving input from the user. The user interface 58 (display) includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 5. Additional details of the user interface 58 (display) will be described below with reference to FIG. 4.

One or more of the other client devices of FIG. 1, such as the other devices 6 (e.g., devices A, B, C) (not shown in FIG. 2) may include similar components as the client device 5 (e.g., the user device) of FIG. 2. In contrast to the client device 5 (e.g., the user device) of FIG. 2, however, at least one of the other devices 6 (devices A, B, C) may have limited user-interface capabilities (e.g., no displays, touch screens, or GUIs) and/or may have some specific dedicated functionality (e.g., speakers, lights, appliances, IoT devices, etc.).

Figure 3:
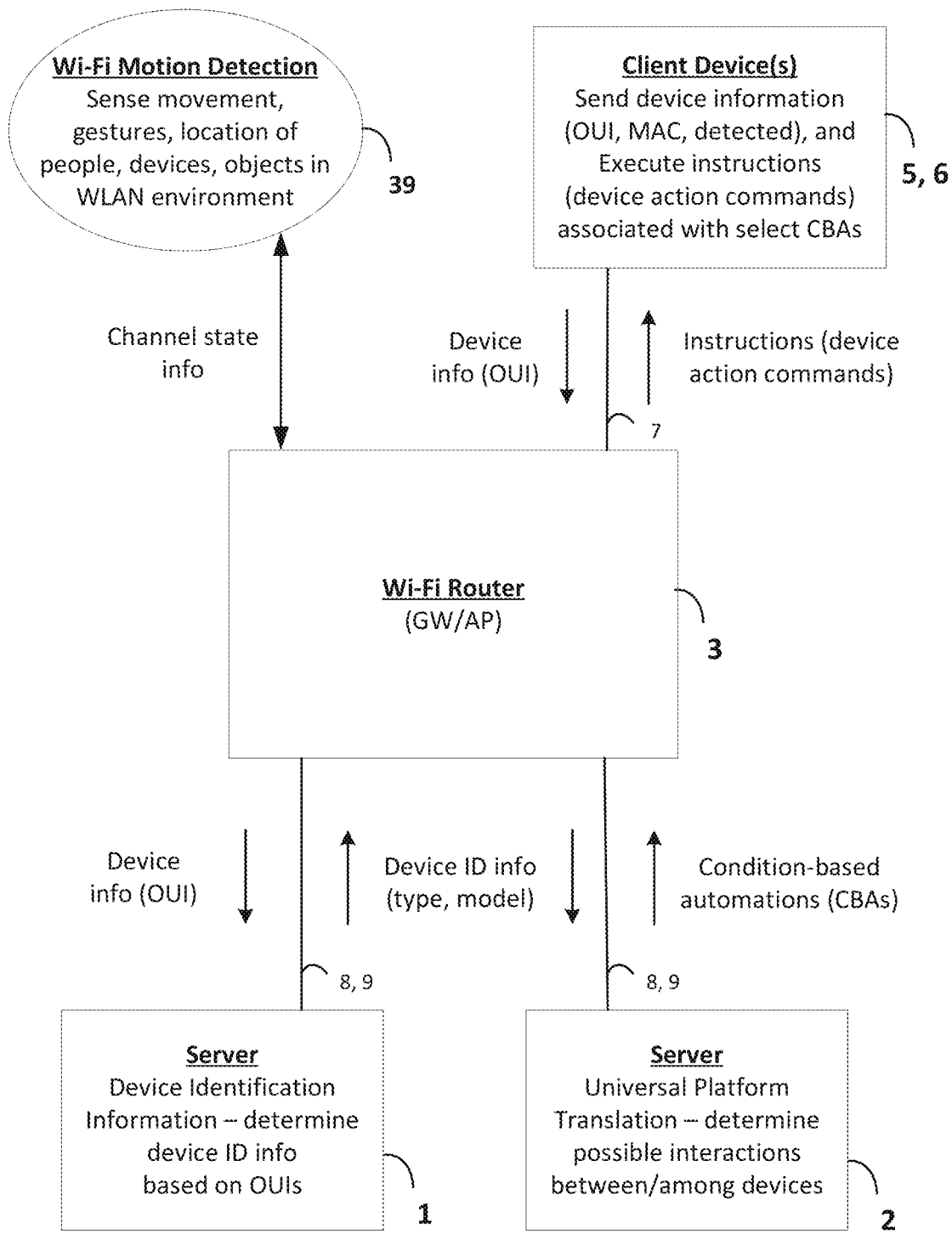
FIG. 3 illustrates a conceptual diagram showing various examples of communications exchanged between the router device, the remote server(s), and the client device(s) of FIGS. 1-2, and integration with Wi-Fi sensing (cognition motion detection function), according to some example embodiments.

FIG. 3 illustrates a conceptual diagram showing various examples of communications exchanged between the router device, the remote server(s), and the client device(s) of FIGS. 1-2, and integration with Wi-Fi sensing (cognition motion detection function), according to some example embodiments.

As shown in FIG. 3, the router device 3 (GW, AP), which includes at least one processor 36 and a memory 34 with one or more programs 35 stored thereon, can implement a Wi-Fi motion detection function 39. For example, the router 3 can execute programming (instructions) to detect motion of people, devices, or objects using Wi-Fi channel state information. The radio waves of Wi-Fi are affected by movement in the environment where the radio waves exist (the WLAN). The router 3 can store in memory which types of disturbances in the Wi-Fi radio waves correlate with particular types of motion in the home, such as movements that occur when certain actions are to be performed by a client device on the network (e.g., a particular pattern in the radio waves results when a person sits on the couch, and this could be used to trigger the TV and smart speaker to turn on, and the lights in the room to dim). For example, the Wi-Fi motion detection function 39 can be implemented using a Cognitive Motion service or similar equivalent service to enable the router device 3 to capture RF channel state information in the WLAN environment.

In this manner, the router 3 performs Wi-Fi motion detection to associate Wi-Fi characteristics (or disturbances) with activities in the home. For example, the user can indicate that a person is sitting on the couch, and the router 3 can then associate a current Wi-Fi radio characteristic with the activity of "person sitting on the couch". The router 3 can also have stored in memory 34 various associations of Wi-Fi characteristics with activities in the home. These stored associations can be user implemented/stored or imported from the internet. For example, the stored associations may be customized or user-defined, or may be predetermined for various different scenarios, contexts, activities, devices, device types, etc.

As shown in FIG. 3, the router 3 can also collect device information from the client devices 5, 6 connected to the home Wi-Fi network (WLAN) via wireless connection 7, such as their media access control (MAC) address and/or their Organizationally Unique Identifier (OUI), which is a 24-bit number that uniquely identifies a vendor or manufacturer, to recognize the client devices (including device type, make/model, etc.) that are in wireless communication with the router.

In this manner, the router 3 obtains the MAC and/or OUI from each client device 5, 6 in the WLAN that is wirelessly connected with the router via Wi-Fi. The router 3 also obtains various kinds of detected information, such as information sensed by the Wi-Fi connected client devices 5, 6 (e.g., temperature, video or audio data from connected cameras, microphones, doorbells, etc.) as well as location information based on signal characteristics such as RSSI, or any other indication sent by a Wi-Fi connected client device.

Thus, in general, the router 3 is positioned to be able to gather information from the client devices 5, 6 on the WLAN (e.g., MAC, OUI, device type, make/model, etc.) and to gather information related to the detection of movement of people, devices, and/or objects in the user's home based on RF channel state information (e.g., via Wi-Fi motion detection function 39).

As shown in FIG. 3, the router 3 can also communicate with one or more server devices 1 (e.g., a remote server or computer located in the cloud) via a wired connection 8 and/or a wireless connection 9. For example, server 1 may be a remote computer that provides a service for identifying the client devices 5, 6 on the home Wi-Fi network (WLAN) based on device information (MAC and/or OUI) received from the client devices 5, 6 with reference to one or more device identification information databases. The server 1 that is located remotely (e.g., in the cloud) can store a database of MAC and/or OUI information correlated with the device type and/or the make or model of the client device (e.g., which are indicative of the manufacturer and the ecosystem or electronic communication platform of the client devices). The device identification information database includes information of various devices and manufacturers and platforms. A non-limiting example of a cloud-based service that identifies devices on a Wi-Fi network is Fing, although similar service providers are also contemplated within the scope of the present disclosure.

In this manner, the router 3 sends the device information (e.g., the MACs/OUIs) to server 1, and receives from server 1 various identification information about the client devices 5, 6 associated with the device information (e.g., device identification information, such as device type, make/model, etc. associated with the MACs/OUIs).

As shown in FIG. 3, the router 3 can also communicate with one or more server devices 2 (e.g., a remote server or computer located in the cloud) via a wired connection 8 and/or a wireless connection 9. For example, server 2 may be another remote computer that provides a service for universally translating proposed (applicable, helpful, recommended, etc.) actions of client devices 5, 6 (and/or combinations thereof) on the user's home Wi-Fi network (WLAN) based on information received from other devices on the network, including the device identification information described above that is received from the server 1, with reference to one or more contextual action databases. The server 2 that is located remotely (e.g., in the cloud) can store a database of condition-based automations (CBAs) correlated with the device identification information (e.g. device type, make/model, etc.). The contextual action database includes information of various devices and manufacturers and platforms. A non-limiting example of a cloud-based service that performs such a translation is IFTTT (If This Then That), which is a web-based service to create chains of simple conditional statements (e.g., applets), although similar service providers are also contemplated within the scope of the present disclosure.

For example, the server 2 can recognize sensed or detected information (e.g., movement), and/or performed device actions, by a client device of a particular platform type and translate it into a signal (e.g., an applet) that causes a desired action by a client device of a different platform type. In this example, the router 3 sends the information received from a first client device of a particular platform type to the cloud server and receives information for a second client device of a different platform type to cause the second client device to perform a desired function. Accordingly, information detected by the first client device on the WLAN can result in a desired action by the second client device on the WLAN.

In this manner, the router 3 also sends a list of client devices 5, 6 (as identified by server 1) to server 2, and receives from server 2 various information indicating possible interactions between or among the client devices 5, 6 that are connected by Wi-Fi with the router 3 (e.g., condition-based automations associated with the device identification information, for instructing specific device actions or combinations thereof).

Thus, in general, the router 3 is positioned to be able to send the information gathered from client devices 5, 6 on the WLAN to remote servers 1, 2 (e.g., cloud-based computing environments) and to receive information from the remote servers 1, 2 to instruct some determined action by other client devices 5, 6 on the WLAN, even though the client devices are of different platform types.

By using Wi-Fi data, the router device 3 will query a remote database (via a remote computer, such as server 2) to extract a list of device automations which are applicable in the user's home. The hardware processor 36 of the router 3 can execute a recommendation engine (e.g., which may be implemented using various forms of software, executable instructions, logic, data structures, etc. such as the one or more programs 35 stored in the memory 34) to filter device actions and present the most relevant/helpful/popular/etc. automations as a set of recommended condition-based automations (CBAs), from which the user can selectively enable one or more desired CBAs from an application running on a client device, such as the user device 5 (e.g., a smart phone), in communication with the router 3. Various conditions associated with the user-selected CBAs are then monitored by the router 3 in the home Wi-Fi network (WLAN), and the device actions associated with the user-selected CBAs are performed by corresponding client devices 5, 6 under control of the router 3.

Additionally or alternatively, the recommendation engine may be executed by a hardware processor on the remote server 2 connected to the router 3 via the Internet (WAN) and/or a hardware processor on a client device, such as the processor 56 of the user device 5 (e.g., a mobile device such as a smartphone or tablet), connected to the router 3 via the WLAN.

By contextualizing Wi-Fi presence data (e.g., via the Wi-Fi motion detection function 39), the processor 36 of the router 3, using the Wi-Fi presence data, can make determinations about the user's status: are they home, did they leave the house, are they making some specific gestures, are they exercising (working out), are they asleep, are they on a voice call (VoIP traffic), are they watching TV (traffic modeling), etc. The user can set various condition-based automations (CBAs) in the router 3 depending on different contexts or situations (also referred to as scenes, scenarios, routines, etc.), such as turn off the Wi-Fi connected vacuum cleaner when the user is on a voice call, or turn on the Wi-Fi connected TV and Wi-Fi connected speakers, etc. when a person sits on the couch.

Figure 4:
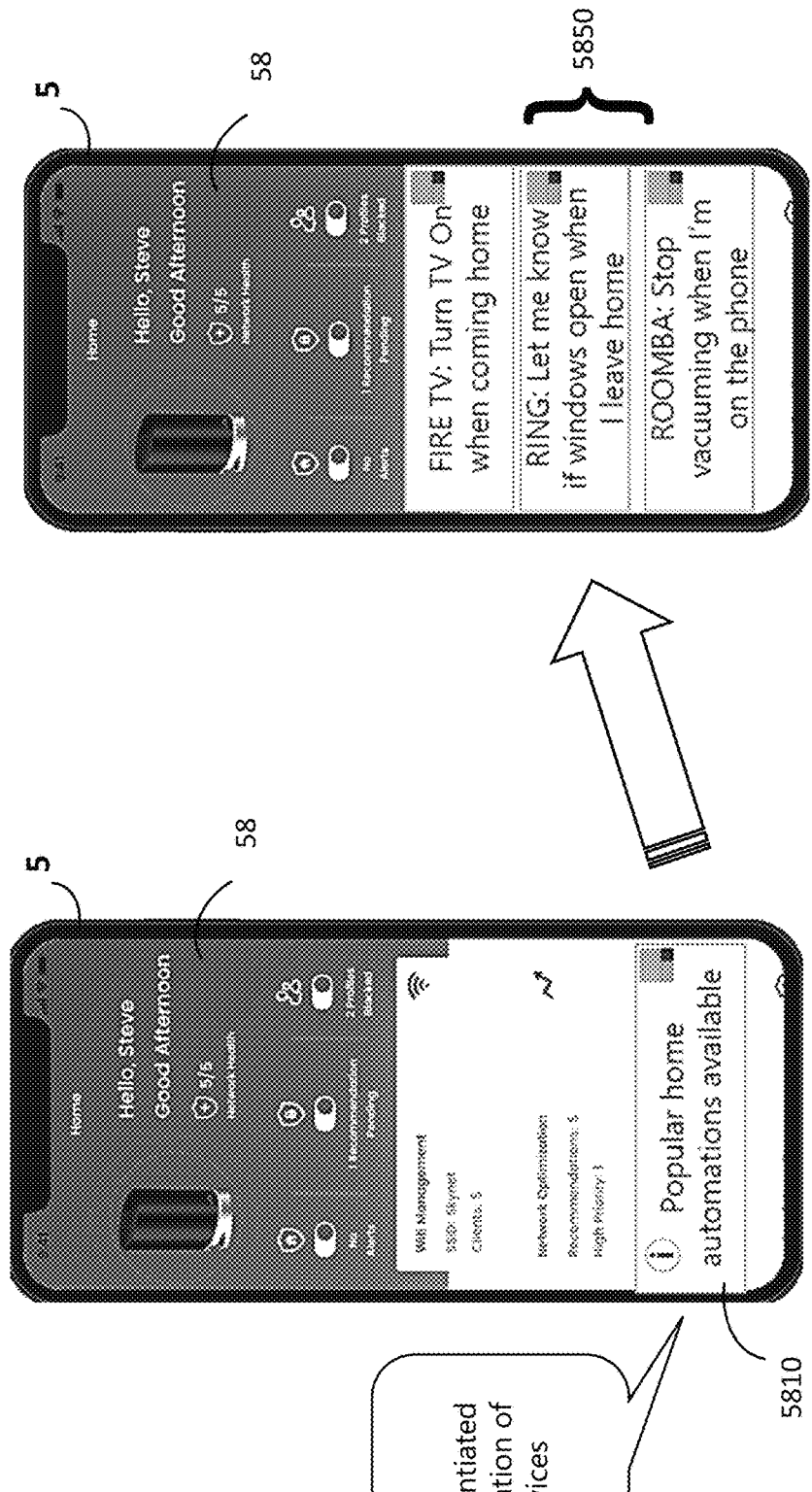
FIG. 4 illustrates example graphical user interface (GUI) screens shown on a display of a client device, according to some example embodiments.

FIG. 4 illustrates example graphical user interface (GUI) screens shown on a display of a client device, according to some example embodiments.

As shown in FIG. 4, at least one of the client devices of FIGS. 1-3, such as the user device 5 (e.g., a mobile device such as a smartphone or tablet), may have an application 55 installed thereon that displays a user interface 58 (e.g., a graphical user interface (GUI)) associated with providing differentiated integration of services. While the application 55 is being operated, a first screen may be displayed, which includes an indication or notification 5810 that there are popular home automations available. In response to the user selecting this indication/notification 5810, a second screen may be displayed that includes a list 5850 of condition-based automations (CBAs) indicating various client devices 5, 6 present in the user's home Wi-Fi network (WLAN) and corresponding device action(s) and/or interactions with other client devices 5, 6 (e.g., the list 5850 may be a complete list of all available/applicable CBAs, or may be a filtered list including certain recommended CBAs provided by a recommendation engine that is executed by at least one of the router device 3, the server device 2, and/or the user device 5).

Specific implementation details of the above-described devices, methods, and system are set forth below with reference to the flow charts illustrated in FIGS. 5-7.

Figure 5:
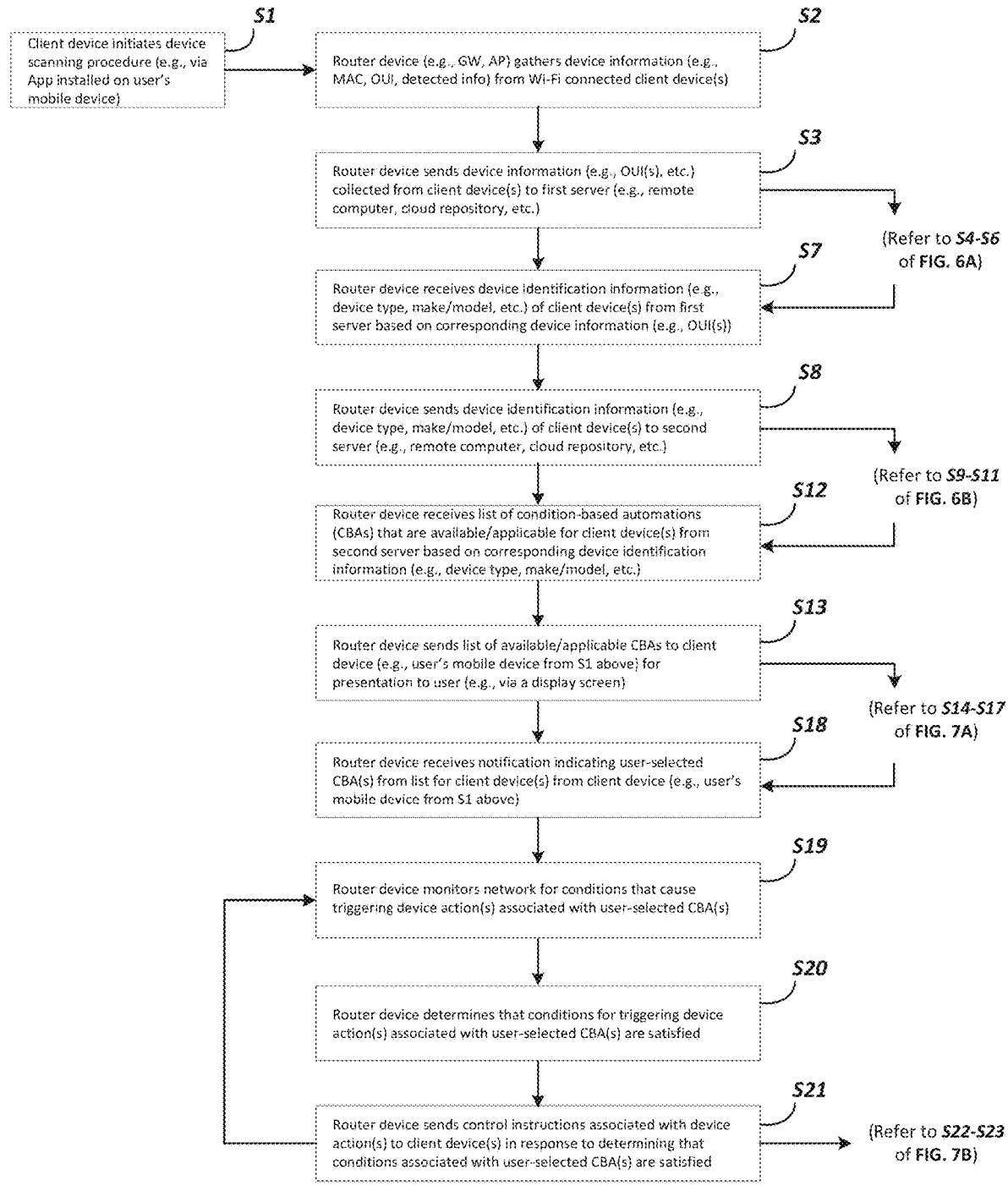
FIG. 5 illustrates a flow chart including various steps of a method for matching operations of client devices hosted on a network with contextual automations (from the perspective of the router device), according to some example embodiments.

FIG. 5 illustrates a flow chart including various steps of a method for matching operations of client devices hosted on a network with contextual automations, according to some example embodiments. FIG. 5 is from the perspective of the router device 3, as described above with reference to FIGS. 1-3.

As shown in FIG. 5, a user initiates a device scanning procedure via a client device, such as the user device 5 (e.g., via an application installed on the user's mobile device, such as a smartphone or tablet) (step S1). The user device 5 is in communication with the router device 3, which then performs the device scanning procedure to detect the client devices 5, 6 that are connected to the router 3 in the home Wi-Fi network (WLAN).

As shown in FIG. 5, in response to initiation of the device scanning procedure via the user device 5, the router 3 gathers device information (e.g., MACs, OUIs, detected or sensed information) from all the Wi-Fi connected client devices 5, 6 that are wirelessly connected with the router 3 (step S2), and sends the device information (e.g., a list of the MACs/OUIs, etc.) collected from the client devices 5, 6 to the remote server 1 (step S3).

According to the example shown in FIG. 1, the router 3 would obtain the OUIs of client devices 5, 6, including the user device 5 (e.g., the OUI of a mobile device, such as the user's smartphone) and the other devices 6 (e.g., the OUI of device A, the OUI of device B, and the OUI device C). Note that the devices A, B, and C can be mobile devices such as smart phones or tablets, or appliances (e.g., televisions, speakers, refrigerators, washing machines, dishwashers, refrigerators, stoves, ovens), or even fixed objects such as lighting fixtures, HVAC units, thermostats, etc. (e.g., any wirelessly-enabled Internet of Things (IoT) device).

Figure 6:
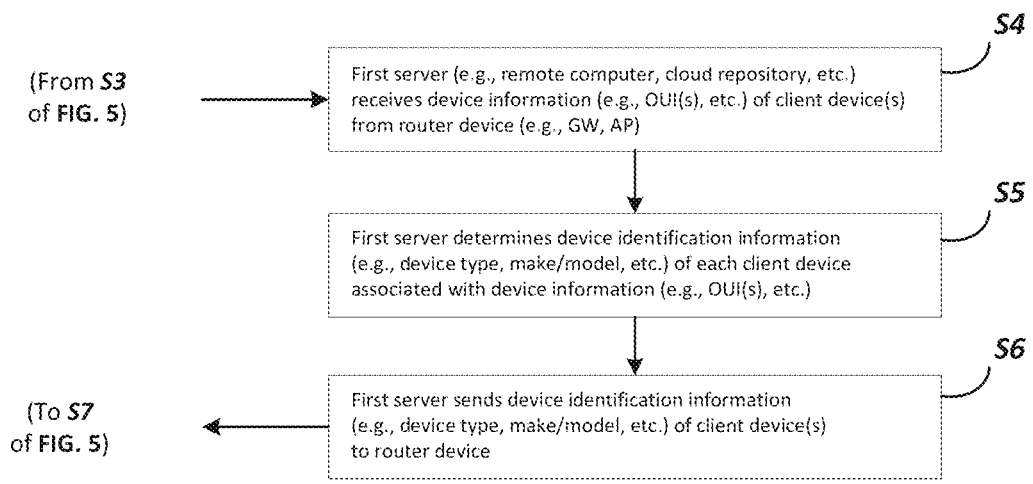
FIG. 6 illustrates flow charts including additional steps of the method for matching operations of client devices hosted on a network with contextual automations of FIG. 5 (from the perspective of the remote servers), according to some example embodiments.
Figure 6:
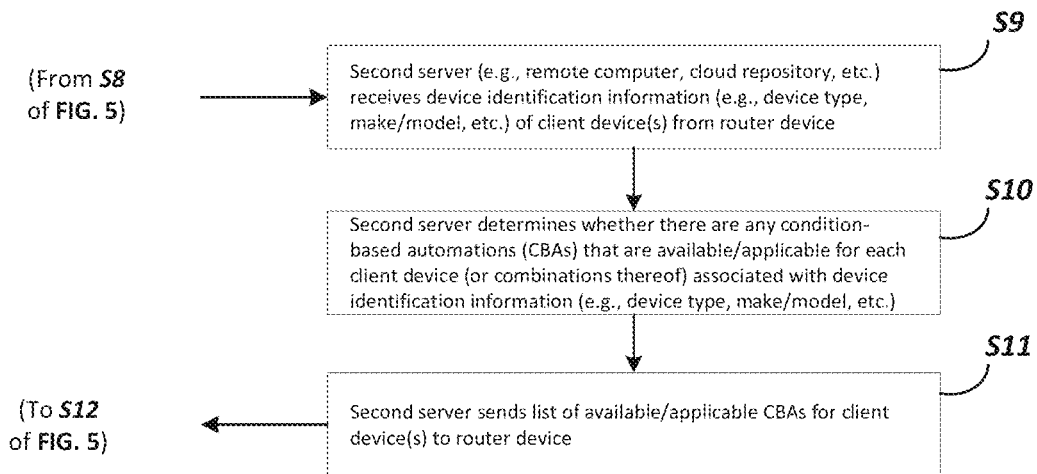

FIG. 6 illustrates flow charts including additional steps of the method for matching operations of client devices hosted on a network with contextual automations of FIG. 5, according to some example embodiments. FIG. 6(*a*) is from the perspective of the remote server 1, and FIG. 6(*b*) is from the perspective of the remote server 2, as described above with reference to FIGS. 1-3.

As shown in FIG. 6(*a*), the remote server 1 receives the device information (e.g., MACs/OUIs, etc.) of the client devices 5, 6 from the router device 3 (step S4), and determines device identification information of each client device 5, 6 associated with the device information (e.g., OUIs, etc.) (step S5). For example, the server 1, by use of a database, determines some device identification information (such as the type of device, make, model, manufacturer, wireless communication type, etc.) associated with each OUI. The server 1 may store or access a device identification information database with mappings that translate device information (e.g., OUIs, etc.) to corresponding device identification information (e.g., device type, make/model, etc.). The server 1 then sends this device identification information (e.g., device type, make/model, etc.) for the client devices 5, 6 back to the router 3 (step S6).

As shown in FIG. 5, the router 3 receives the device identification information (e.g., device type, make/model, etc.) of each client device 5, 6 from the server 1 based on the corresponding device information (e.g., OUIs, etc.) (step S7), and stores this device identification information in its memory. The router 3 then sends a list of all the device identification information (including the device type, make/model, and any other information obtained from server 1) of the client devices 5, 6 that are connected to the router 3 via Wi-Fi (e.g., the user device 5, and the other devices A, B, and C) to the remote server 2 (step S8).

As shown in FIG. 6(*b*), the remote server 2 receives the device identification information (e.g., device type, make/model, etc.) of the client devices 5, 6 from the router 3 (step S9), and determines whether there are any condition-based automations (CBAs) that are available/applicable for each client device 5, 6 (and/or various different combinations of multiple client devices) associated with the device identification information of the client devices 5, 6 (step S10). For example, the remote server 2, by use of a database, determines possible actions of the client devices 5, 6 in the list (the user device 5 and/or the other devices 6 including devices A, B, and C) and/or interactions between or among plural client devices 5, 6 in the list. The server 2 may store or access a contextual device action database with mappings that translate device identification information (e.g., device type, make/model, etc.) to corresponding CBAs (e.g., the possible actions and/or interactions). The server 2 then sends information indicative of the possible device actions and/or interactions between multiple devices (e.g., a list of available/applicable CBAs) for the client devices 5, 6 back to the router 3 (step S11). For example, the information sent to the router 3 by the server 2 can include the instruction codes sent by a device indicating sensed activity (e.g., temperature, motion, etc.) and the codes for causing a client device to perform an action, with these codes being in the appropriate language of the platform/ecosystem of the client device.

As shown in FIG. 5, the router 3 receives the information indicative of the possible actions and/or interactions (e.g., the list of CBAs that are available/applicable for the client devices 5, 6) from the server 2 based on corresponding device identification information (e.g., device type, make/model, etc.) (step S12), and stores the related instruction codes in its memory. The router 3 then indicates the possible actions and/or interactions to the user by sending a list of the available/applicable CBAs to the user device 5 (e.g., a mobile device such as a smartphone or tablet, from S above) over the home Wi-Fi network (WLAN) for presentation to the user (e.g., via a display screen including a GUI) (step S13).

In some example embodiments, the remote server 2, the router device 3, the user device 5, or combinations thereof, may execute a recommendation engine (e.g., a set of filtering rules). The recommendation engine may filter the list of available/applicable CBAs for the client devices 5, 6 to select the most relevant/helpful/popular/etc. CBAs, as a set of recommended CBAs.

Figure 7:
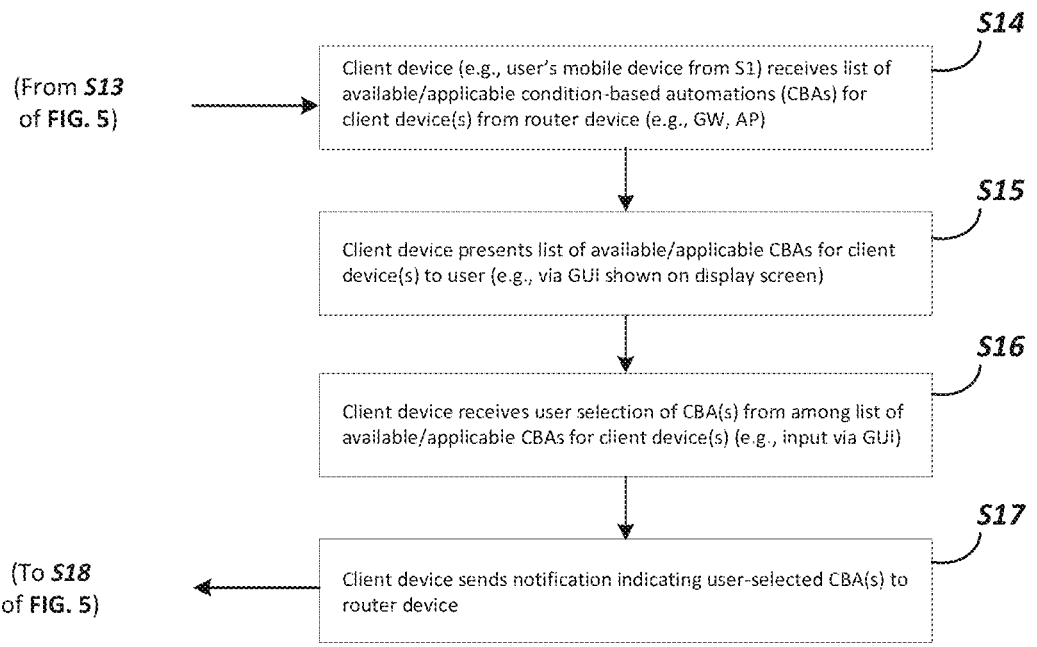
FIG. 7 illustrates flow charts including additional steps of the method for matching operations of client devices hosted on a network with contextual automations of FIG. 5 (from the perspective of the client devices), according to some example embodiments.
Figure 7:
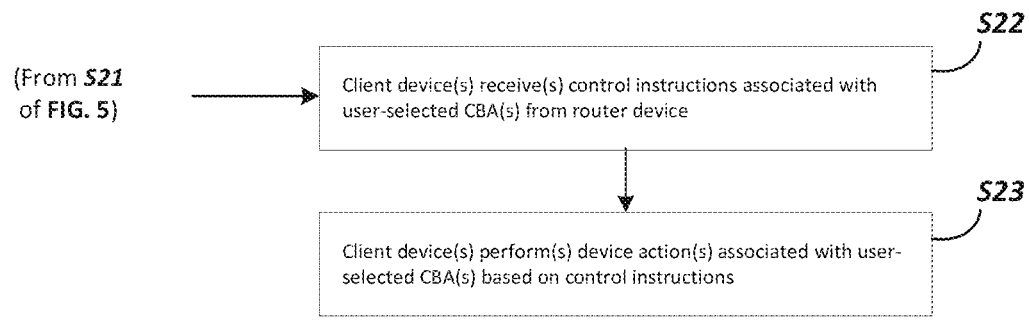

FIG. 7 illustrates flow charts including additional steps of the method for matching operations of client devices hosted on a network with contextual automations of FIG. 5, according to some example embodiments. FIG. 7(*a*) is from the perspective of the user device 5, and FIG. 7(*b*) is from the perspective of one or more of the client devices 5, 6 (or combinations thereof), as described above with reference to FIGS. 1-3.

As shown in FIG. 7(*a*), the user device 5 (e.g., the mobile device such as a smartphone from S1 above) receives the list of available/applicable CBAs for the client devices 5, 6 from the router 3 (step S14), and presents the list of available/ applicable CBAs indicating the possible actions for and/or interactions between the client devices 5, 6 to the user (e.g., via the GUI shown on the display screen of the user device 5) (step S15). Then the user device 5 receives a user selection of one or more CBA(s) from among the list of available/applicable CBAs for the client devices 5, 6 (e.g., user input via the GUI) (step S16), and sends a notification indicating the one or more user-selected CBA(s) back to the router 3 (step S17).

Referring again to FIG. 4, for example, an application 55 installed on the user device 5 may present a list 5850 of condition-based automations (CBAs) that will allow the user to select actions (e.g., via the GUI 58 shown on the display of the user's mobile device) to be performed by one or more of the Wi-Fi connected client devices 5, 6 or to effect "if then" scenarios of an action by one client device occurring based on some detection or action by another client device (or a detection of a learned Wi-Fi motion detection).

In addition to learned detection to action processes, the server 2 can send to the router 3, and the router 3 can store in its memory, complete possible detection-action sequences of all possible iterations among the client devices 5, 6 that are identified by the server 1 and sent to the server 2 by the router 3 (e.g., the user device 5 and all the other devices 6 that are Wi-Fi connected with the router 3).

Furthermore, the router 3 itself can be included in the databases used by servers 1 and 2, and thus interactions between the router 3 itself (e.g., Wi-Fi motion detection) and one or more of the Wi-Fi connected client devices 5, 6 can be stored in the databases and included in the list of possible actions and/or interactions (CBAs).

As shown in FIG. 5, the router 3 receives the notification indicating the one or more user-selected CBA(s) from among the list of available/applicable CBAs for the client devices 5, 6 from the user device 5 (e.g., the mobile device from S1 and S4-S17 above) (step S18). The router 3 then monitors the home Wi-Fi network (WLAN) for conditions that cause triggering one or more device action(s) associated with at least one of the user-selected CBA(s) (step S19), and determines whether the conditions for triggering the one or more device action(s) associated with at least one of the one or more user-selected CBA(s) are satisfied (step S20). For example, the conditions may include but are not limited to the Wi-Fi sensing (e.g., Wi-Fi motion detection function 39) described herein.

If the conditions have not been satisfied for any of the user-selected CBA(s) (No at S20), the router 3 will continue monitoring the user's home Wi-Fi network (WLAN) for occurrence of the conditions. If the router 3 determines that the conditions for triggering the one or more device action(s) associated with at least one of the one or more user-selected CBA(s) have been satisfied (Yes at S20), then the router 3 sends control instructions associated with the one or more device action(s) corresponding to the at least one of the user-selected CBA(s) to at least one of the client devices 5, 6 (step S21).

As shown in FIG. 7(*b*), the at least one of the client devices 5, 6 (e.g., the user device 5 and/or one or more of the other devices 6 in the WLAN, and/or combinations thereof) receive(s) the control instructions associated with the at least one of the user-selected CBA(s) from the router 3 (step S22), and the at least one of the client devices 5, 6 then perform(s) the one or more device action(s) associated with the at least one of the user-selected CBAs based on the control instructions (step S23). As described above, there may also be various interactions among multiple client devices 5, 6.

After controlling the client device(s) 5, 6 in this manner, the router device 3 may return to step S19 and continue monitoring the user's home Wi-Fi network (WLAN) for additional occurrences of the conditions associated with the one or more user-selected CBA(s), for example.

Example Use Cases

Now, various example use cases (also referred to as scenarios, scenes, routines, or the like) will be described with reference to the devices, methods, and system set forth above in connection with FIGS. 1-7.

For example, consider device A is a television. The router 3 has a Wi-Fi motion detection program which can sense a characteristic of the Wi-Fi radio waves. The user sits on the couch and instructs the router 3 (e.g., via an app on the user's mobile device such as a smartphone) that the current Wi-Fi radio characteristic is "person sitting on the couch". This information is stored in the memory of the router. The information from the server 2 includes an instruction code for turning on the television. The user instructs the router 3 (e.g., via the app on the user's mobile device) that when the Wi-Fi motion detection detects the characteristic indicative of "person sitting on the couch" then the router 3 is to instruct the television to turn on.

Similarly, interaction between two devices can be implemented. For example, as an alternative to the above example, consider that device B is a camera (e.g., on an electronic assistant, a smart media device, or set top box), and device B is positioned to view the couch. The device B sends a signal that based on the camera image, the condition of "person sitting on the couch" exists. The information from the server 2 includes an instruction code for turning on the television. The user instructs the router 3 (e.g., via an app on a smartphone) that when the device B detects the condition "person sitting on the couch" then the router 3 is to instruct the television to turn on. Thus, the router would receive information from device B in the language of its platform, and send the appropriate action command to the television to turn on.

The following is a list of various other example scenarios or contexts:

Scene 0 (onboarding and initialization)—device onboarding completes and the router 3 scans the network for client devices 5, 6, server 1 (e.g., Fing) identifies device types, server 2 (e.g., IFTTT) runs device types against known Applet database, router 3 uses Fing results to match with IFTTT database and applets for each client device and also applets connecting multiple ecosystems. Refer to the displayed GUI screens of FIG. 4 described above.

Scene 1 (leaving home) and Scene 2 (returning home)—router 3 performs Wi-Fi motion detection function (has learned door open/close motion, detects movement towards edges of network), router 3 detects MAC or OUI association/disassociation and triggers IFTTT applet (e.g., Ring arms security system or prompts user to disarm security system, Ring informs user (via SBC) if window (Ring sensor) is left open, Philips turns the lights off or on, Roomba starts cleaning session or returns to base station, etc.).

Scene 3 (consume entertainment in living space)—router 3 performs Wi-Fi motion detection function (has learned "couch potato" motion), router 3 determines who is sitting (via MAC/OUI) and triggers IFTTT applet (e.g., Chromecast triggers TV to power on, Philips turns down the lights (dimmer function), Smart speaker powers on and sets source to "TV", etc.).

Scene 4 (dangerous condition or emergency situation)—router 3 performs Wi-Fi motion detection function (detects a fall or other dangerous movement) and triggers IFTTT applet (e.g., Echo enables intercom mode or dials emergency contact, SBC prompts user to confirm if they are "OK", etc.).

Scene 5 (late night snack)—router 3 performs Wi-Fi motion detection function (detects movement as user gets up from bed, router 3 detects user still has "DND" (do not disturb) on and triggers IFTTT applet (e.g., Philips turns on lights in night-light mode, etc.).

Scene 6 (self-improvement mode)—user sets up personal goal using the chores/budget function of SBC (e.g., exercise for 15 minutes before turning on TV in the morning), router performs Wi-Fi motion detection function (detects if user is moving and breathing rate is increased for sustained 15 minutes) and triggers IFTTT applet (e.g., Echo plays music playlist over smart speaker during workout, and TV is turned on at completion of 15 minute workout, etc.).

The example use case scenarios described above are not exhaustive or limiting, but rather are intended for illustrative purposes to further understand the inventive concepts described herein. Many other examples are within the scope of the present disclosure, depending on the devices and device types, conditions, user preferences or patterns.

As described in detail above, the devices, methods, and system of the present disclosure integrates device identification (fingerprinting) with Wi-Fi motion sensing and IFTTT to propose various automations (including recommended CBAs) to the user between devices powered by a cloud-to-cloud solution that removes communication barriers between diverse ecosystems. Accordingly, the above-described solution solves the compatibility issues that may arise when various different client devices are associated with different manufacturers or service providers in a wireless network in order to provide an integrated Wi-Fi motion-based smart home solution.

The processes and software programs disclosed above constitute algorithms that can be effected by software, applications (apps, or mobile apps), computer programs, or a combination thereof (e.g. an app on a mobile device operating in conjunction with and/or in communication with a software program on the electronic apparatus (router) and/or a software program on the remote servers in the cloud). The software, applications, computer programs (and also device data and various other types of information) can be stored on a non-transitory computer-readable medium for causing a computer, such as the one or more processors, to execute the processes described herein and shown in the drawing figures.

The term non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The above-described example embodiments may be implemented as any combination of an apparatus, a system, an integrated circuit, and a computer program on a non-transitory computer readable recording medium. The one more processor(s) may be implemented as an integrated circuit (IC), an application specific integrated circuit (ASIC), or large-scale integrated circuit (LSI), system LSI, super LSI, or ultra LSI components that perform a part or all of the functions described herein.

The invention claimed is:

1. A router device for matching operations of client devices hosted on a network with contextual automations, the router device comprising:
   a memory storing instructions; and
   a processor configured to execute the instructions to:
      gather device information from client devices that are connected to the router device via a wireless local area network (WLAN), wherein the client devices include a user device and one or more other devices, and wherein the device information includes at least one of media access control (MAC) addresses and organizationally unique identifiers (OUIs) of the client devices;
      send the device information collected from the client devices to a first remote server;
      receive device identification information of the client devices from the first remote server based on the device information, respectively;
      send the device identification information of the client devices to a second remote server;
      query the second remote server and in response to the query receive a list of condition-based automations (CBAs) that are available and applicable for one or more of the client devices from the second remote server based on the device identification information, wherein the CBAs relate to one or more instruction codes that cause the one or more client devices to perform one or more device actions; and
      send the list of CBAs to the user device for presentation via a display.

2. The router device of claim 1, wherein:
   the device identification information of each client device is determined based on a device identification information database storing mappings for translating device information of the client devices into corresponding device identification information for the client devices, respectively,
   the device information includes at least one of media access control (MAC) addresses and organizationally unique identifiers (OUIs) of the client devices, and
   the device identification information includes at least one of device type and make/model of the client devices.

3. The router device of claim 1, wherein:
   the list of CBAs for the client devices is determined based on a contextual device actions database storing mappings for translating device identification information of the client devices into corresponding condition-based automations that are available and applicable for the client devices or different combinations of multiple client devices, respectively,
   the device identification information of the client devices includes at least one of device type and make/model of the client devices, and
   the condition-based automations for the client devices include one or more device actions to be performed by one or more client devices or a series of interactions between multiple client devices.

4. The router device of claim 1, wherein, in response to receiving one or more commands via an application installed on the user device, the processor is configured to execute the instructions to:
  initiate a device scanning procedure to detect the client devices that are connected to the router via the WLAN; and
  filter the list of CBAs that are available and applicable for the one or more client devices to generate a set of recommended CBAs that are most useful, helpful, or popular, depending on particular client devices or combinations of client devices that are present in the WLAN.

5. The router device of claim 1, wherein the processor is further configured to execute the instructions to:
  receive a notification indicating one or more user-selected CBAs from among the list of CBAs that are available and applicable for the one or more client devices from the user device;
  monitor the WLAN for conditions that cause triggering one or more device actions associated with the one or more user-selected CBAs;
  determine whether the conditions for triggering the one or more device actions associated with at least one of the one or more user-selected CBAs are satisfied; and
  send control instructions associated with the one or more device actions to at least one of the client devices, in response to determining that the conditions for triggering the one or more device actions associated with the at least one of the one or more user-selected CBAs have been satisfied.

6. The router device of claim 5, wherein the control instructions sent by the router device cause the at least one of the client devices to perform the one or more device actions associated with the at least one of the user-selected CBAs, respectively.

7. A method for matching operations of client devices hosted on a network with contextual automations, the method comprising:
  gathering device information from client devices that are connected to a router device via a wireless local area network (WLAN), wherein the client devices include a user device and one or more other devices, and wherein the device information includes at least one of media access control (MAC) addresses and organizationally unique identifiers (OUIs) of the client devices;
  sending the device information collected from the client devices to a first remote server;
  receiving device identification information of the client devices from the first remote server based on the device information, respectively;
  sending the device identification information of the client devices to a second remote server;
  querying the second remote server and in response to the querying receiving a list of condition-based automations (CBAs) that are available and applicable for one or more of the client devices from the second remote server based on the device identification information; and
  sending the list of CBAs to the user device for presentation via a display.

8. The method of claim 7, wherein the first remote server receives the device information of the client devices from the router device, determines the device identification information of each client device associated with the device information, respectively, based on a device identification information database, and sends the device identification information of the client devices to the router device.

9. The method of claim 7, wherein the second remote server receives the device identification information of the client devices from the router device, determines whether there are any condition-based automations (CBAs) that are available and applicable for each client device or different combinations of multiple client devices associated with the device identification information of the client devices, respectively, based on a contextual device actions database, and sends the list of CBAs that are available and applicable for the one or more client devices to the router device.

10. The method of claim 7, wherein the user device initiates a device scanning procedure to detect client devices in the WLAN via an application installed on the user device, receives the list of CBAs that are available and applicable for the one or more client devices from the router device, presents the list of CBAs via a graphical user interface (GUI) shown on the display, receives a user selection of one or more CBAs from among the list of CBAs for the one or more client devices via the GUI, and sends a notification indicating the one or more user-selected CBAs to the router device.

11. The method of claim 7, further comprising:
  receiving a notification indicating one or more user-selected CBAs from among the list of CBAs that are available and applicable for the one or more client devices from the user device;
  monitoring the WLAN for conditions that cause triggering one or more device actions associated with the one or more user-selected CBAs;
  determining whether the conditions for triggering the one or more device actions associated with at least one of the one or more user-selected CBAs are satisfied; and
  sending control instructions associated with the one or more device actions to at least one of the client devices, in response to determining that the conditions for triggering the one or more device actions associated with the at least one of the one or more user-selected CBAs have been satisfied.

12. The method of claim 11, wherein the at least one of the client devices receives the control instructions associated with the at least one of the user-selected CBAs from the router device, and performs the one or more device actions associated with the at least one of the user-selected CBAs based on the control instructions.

13. A non-transitory computer-readable medium storing a program of instructions for matching operations of client devices hosted on a network with contextual automations, the instruction when executed by a processor of a router device causing the router device to perform operations comprising:
  gathering device information from client devices that are connected to the router device via a wireless local area network (WLAN), wherein the client devices include a user device and one or more other devices;
  sending the device information collected from the client devices to a first remote server;
  receiving device identification information of the client devices from the first remote server based on the device information, respectively;
  sending the device identification information of the client devices to a second remote server;
  querying the second remote server and in response to the querying receiving a list of condition-based automations (CBAs) that are available and applicable for one or more of the client devices from the second remote server based on the device identification information, wherein the CBAs relate to one or more instruction codes that cause the one or more client devices to perform one or more device actions; and sending the list of CBAs to the user device for presentation via a display.

14. The non-transitory computer-readable medium of claim 13, wherein the first remote server receives the device information of the client devices from the router device, determines the device identification information of each client device associated with the device information, respectively, based on a device identification information database, and sends the device identification information of the client devices to the router device.

15. The non-transitory computer-readable medium of claim 13, wherein the second remote server receives the device identification information of the client devices from the router device, determines whether there are any condition-based automations (CBAs) that are available and applicable for each client device or different combinations of multiple client devices associated with the device identification information of the client devices, respectively, based on a contextual device actions database, and sends the list of CBAs that are available and applicable for the one or more client devices to the router device.

16. The non-transitory computer-readable medium of claim 13, wherein the user device initiates a device scanning procedure to detect client devices in the WLAN via an application installed on the user device, receives the list of CBAs that are available and applicable for the one or more client devices from the router device, presents the list of CBAs via a graphical user interface (GUI) shown on the display, receives a user selection of one or more CBAs from among the list of CBAs for the one or more client devices via the GUI, and sends a notification indicating the one or more user-selected CBAs to the router device.

17. The non-transitory computer-readable medium of claim 13, wherein the instructions when executed by the processor further causing the router device to perform operations comprising:

receiving a notification indicating one or more user-selected CBAs from among the list of CBAs that are available and applicable for the one or more client devices from the user device;

monitoring the WLAN for conditions that cause triggering one or more device actions associated with the one or more user-selected CBAs;

determining whether the conditions for triggering the one or more device actions associated with at least one of the one or more user-selected CBAs are satisfied; and sending control instructions associated with the one or more device actions to at least one of the client devices, in response to determining that the conditions for triggering the one or more device actions associated with the at least one of the one or more user-selected CBAs have been satisfied.

18. The non-transitory computer-readable medium of claim 17, wherein the at least one of the client devices receives the control instructions associated with the at least one of the user-selected CBAs from the router device, and performs the one or more device actions associated with the at least one of the user-selected CBAs based on the control instructions.

19. The non-transitory computer-readable medium of claim 13, wherein the instructions when executed by the processor further causing the router device to perform operations comprising:

sending a list of the client devices to the second remote server; and receiving information indicating one or more interaction between the client devices from the second remote server, wherein the information comprises the CBAs.

20. The non-transitory computer-readable medium of claim 19, wherein the information comprises the CBAs.

* * * * *